United States Patent
Millet et al.

(10) Patent No.: US 12,307,255 B2
(45) Date of Patent: May 20, 2025

(54) ADDRESS GENERATOR USING MEMORY ACCESS OPERATION TYPE FOR A COMPUTER WITH A SINGLE INSTRUCTION MULTIPLE DATA ARCHITECTURE

(71) Applicant: COMMISSARIAT A L'ENERGIE ATOMIQUE ET AUX ENERGIES ALTERNATIVES, Paris (FR)

(72) Inventors: Raphaël Millet, Gif-sur-Yvette (FR); Benoit Tain, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 95 days.

(21) Appl. No.: 18/115,707

(22) Filed: Feb. 28, 2023

(65) Prior Publication Data
US 2023/0289188 A1 Sep. 14, 2023

(30) Foreign Application Priority Data
Mar. 11, 2022 (FR) .................................... 2202150

(51) Int. Cl.
*G06F 9/345* (2018.01)
*G06F 9/355* (2018.01)
(Continued)

(52) U.S. Cl.
CPC .............. *G06F 9/345* (2013.01); *G06F 12/02* (2013.01); *G06F 12/0207* (2013.01);
(Continued)

(58) Field of Classification Search
CPC .......... G06F 9/345; G06F 12/02; G06F 9/355; G06F 12/0607; G06F 17/153;
(Continued)

(56) References Cited

U.S. PATENT DOCUMENTS 5,327,541 A 7/1994 Reinecke et al.
5,778,416 A 7/1998 Harrison et al.
(Continued)

FOREIGN PATENT DOCUMENTS

EP 0 232 641 A2 8/1987
EP 3 330 900 A1 6/2018
(Continued)

OTHER PUBLICATIONS

Nieto, Alejandro, David L. Vilarino, and Victor M. Brea. "Precision: A reconfigurable SIMD/MIMD coprocessor for Computer Vision Systems-on-Chip." IEEE Transactions on Computers 65.8 (2015): 2548-2561. (Year: 2015).*
Analog Devices, "ADSP-21160 SHARC DSP Hardware Reference, Data Address Generators".

*Primary Examiner* — Kenneth M Lo
*Assistant Examiner* — Hewy H Li
(74) *Attorney, Agent, or Firm* — BakerHostetler (57) ABSTRACT

An address generator for a computer with a single instruction multiple data architecture includes a plurality of elementary processors each associated with a local memory, each elementary processor having access to its local memory and at least one access to a neighbouring local memory of another elementary processor, the address generator configured, in response to a computing instruction, to determine an identical memory access address for all the elementary processors, the address generator including: a first computing unit for computing a first access offset value in a first addressing dimension, and an adder for computing the memory access address as the sum of the first access offset value and of a predetermined initial offset value dependent on a memory access operation type indicated by the computing instruction from among a memory access operation to the local memory or a memory access operation to any of the neighbouring local memories.

12 Claims, 11 Drawing Sheets

(51) Int. Cl.
*G06F 12/02* (2006.01)
*G06F 12/06* (2006.01)
*G06F 17/15* (2006.01)
*G06N 3/0464* (2023.01)
*G06N 3/063* (2023.01)

(52) U.S. Cl.
CPC ............ *G06F 17/153* (2013.01); *G06F 9/355* (2013.01); *G06F 12/0607* (2013.01); *G06F 2212/1016* (2013.01); *G06F 2212/454* (2013.01); *G06N 3/0464* (2023.01); *G06N 3/063* (2013.01)

(58) Field of Classification Search
CPC ....... G06F 2212/1016; G06F 2212/454; G06F 12/0223; G06F 12/0207; G06N 3/0464; G06N 3/063
See application file for complete search history.

(56) References Cited

U.S. PATENT DOCUMENTS

| | | | |
|---|---|---|---|
| 6,049,858 | A | 4/2000 | Kolagotla et al. |
| 6,526,430 | B1 | 2/2003 | Hung et al. |
| 6,647,484 | B1 | 11/2003 | Jiang et al. |
| 7,064,987 | B2 | 6/2006 | Lin |
| 9,203,671 | B2 | 12/2015 | Xu |
| 9,529,747 | B2 | 12/2016 | Anderson |
| 2011/0252204 | A1* | 10/2011 | Coon .................... G06F 12/084 711/E12.016 |
| 2014/0115302 | A1 | 4/2014 | Higham et al. |
| 2014/0189308 | A1 | 7/2014 | Hughes et al. |
| 2020/0356367 | A1 | 11/2020 | Van Lunteren |

FOREIGN PATENT DOCUMENTS

| | | |
|---|---|---|
| EP | 3 396 533 A2 | 10/2018 |
| FR | 2 984 556 A1 | 6/2013 |

* cited by examiner

| @ | Pad | PE₀ | PE₁ | PE₂ | PE₃ | Pad |
|---|---|---|---|---|---|---|
| 0 | | 0:0:0 | 0:0:2 | 0:0:4 | 0:0:6 | |
| 1 | | 0:0:1 | 0:0:3 | 0:0:5 | 0:0:7 | |
| 2 | | 1:0:0 | 1:0:2 | 1:0:4 | 1:0:6 | |
| 3 | | 1:0:1 | 1:0:3 | 1:0:5 | 1:0:7 | |
| 4 | | 0:1:0 | 0:1:2 | 0:1:4 | 0:1:6 | |
| 5 | | 0:1:1 | 0:1:3 | 0:1:5 | 0:1:7 | |
| 6 | | 1:1:0 | 1:1:2 | 1:1:4 | 1:1:6 | |
| 7 | | 1:1:1 | 1:1:3 | 1:1:5 | 1:1:7 | |
| 8 | | 0:2:0 | 0:2:2 | 0:2:4 | 0:2:6 | |
| 9 | | 0:2:1 | 0:2:3 | 0:2:5 | 0:2:7 | |
| 10 | | 1:2:0 | 1:2:2 | 1:2:4 | 1:2:6 | |
| 11 | | 1:2:1 | 1:2:3 | 1:2:5 | 1:2:7 | |

| kernelPixel | Z (D2) | | Y (D1) | | X (D0) | | Access | | address |
|---|---|---|---|---|---|---|---|---|---|
| | Cpt | Offset | Cpt | Offset | Cpt | Offset | Type | offset | |
| 0:0:0 | 0 | 0 | 0 | 0 | 0 | 0 | memL | 1 | 1 |
| 0:0:1 | 0 | 0 | 0 | 0 | 1 | 0 | mem | 0 | 0 |
| 0:0:2 | 0 | 0 | 0 | 0 | 2 | 1 | memL | 1 | 1 |
| 0:1:0 | 0 | 0 | 1 | 4 | 0 | 0 | memL | 1 | 5 |
| 0:1:1 | 0 | 0 | 1 | 4 | 1 | 0 | mem | 0 | 4 |
| 0:1:2 | 0 | 0 | 1 | 4 | 2 | 1 | memL | 1 | 5 |
| 0:2:0 | 0 | 0 | 2 | 8 | 0 | 0 | memL | 1 | 9 |
| 0:2:1 | 0 | 0 | 2 | 8 | 1 | 0 | mem | 0 | 8 |
| 0:2:2 | 0 | 0 | 2 | 8 | 2 | 1 | memL | 1 | 9 |
| 1:0:0 | 1 | 2 | 0 | 0 | 0 | 0 | memL | 1 | 3 |
| 1:0:1 | 1 | 2 | 0 | 0 | 1 | 0 | mem | 0 | 2 |
| 1:0:2 | 1 | 2 | 0 | 0 | 2 | 1 | memL | 1 | 3 |
| 1:1:0 | 1 | 2 | 1 | 4 | 0 | 0 | memL | 1 | 7 |
| 1:1:1 | 1 | 2 | 1 | 4 | 1 | 0 | mem | 0 | 6 |
| 1:1:2 | 1 | 2 | 1 | 4 | 2 | 1 | memL | 1 | 7 |
| 1:2:0 | 1 | 2 | 2 | 8 | 0 | 0 | memL | 1 | 11 |
| 1:2:1 | 1 | 2 | 2 | 8 | 1 | 0 | mem | 0 | 10 |
| 1:2:2 | 1 | 2 | 2 | 8 | 2 | 1 | mem | 0 | 11 |

Instructions

CFG ACCESS OFFSETS
OPERATION MAC (MemG)
OPERATION MAC (Mem)
OPERATION MAC (Mem)
OPERATION MAC (MemG)
OPERATION MAC (Mem)
OPERATION MAC (Mem)
OPERATION MAC (MemG)
OPERATION MAC (Mem)
OPERATION MAC (Mem)
OPERATION MAC (MemG)
OPERATION MAC (Mem)
OPERATION MAC (Mem)
OPERATION MAC (MemG)
OPERATION MAC (Mem)
OPERATION MAC (Mem)
OPERATION MAC (MemG)
OPERATION MAC (Mem)
OPERATION MAC (Mem)

ADDRESS GENERATOR USING MEMORY ACCESS OPERATION TYPE FOR A COMPUTER WITH A SINGLE INSTRUCTION MULTIPLE DATA ARCHITECTURE

CROSS-REFERENCE TO RELATED APPLICATION

This application claims priority to foreign French patent application No. FR 2202150, filed on Mar. 11, 2022, the disclosure of which is incorporated by reference in its entirety.

FIELD OF THE INVENTION

The invention relates to the field of computing systems incorporating single instruction multiple data or SIMD accelerators, and pertains more precisely to an address generator for such a computer for optimizing the ratio of numbers of operations per computing cycle by proposing computing an address in one cycle.

BACKGROUND

Systems based on SIMD architectures make it possible to carry out multiple applications that require a large number of operations on a significant quantity of data. One exemplary application relates to artificial intelligence, and in particular to convolutional neural networks that require the execution of a very large number of MAC (multiply-accumulate) operations to carry out convolution computations on multi-dimensional datasets.

Applied to embedded systems, SIMD accelerators have to exhibit high performance despite limited resources and low power consumption that has to remain compatible with battery-operated equipment. One of the major challenges relates to movements of data within the architecture. In order to satisfy performance and consumption constraints, preference should be given to reusing data and it is necessary to implement mechanisms for limiting movements or manipulation of data during processing operations.

One challenge to be addressed for such systems is that of supplying data to the computing units (also called elementary processors or PE) that carry out computations in parallel. A clever way of manipulating the data is often necessary in order to present the correct datum to the correct computing unit in each cycle. To this end, some architectures allow coupling between each elementary processor and a local memory. Neighbouring access operations are permitted, in other words each elementary processor is able to access multiple local memories and each local memory is shared between multiple elementary processors. In this type of architecture, there is a need for a common address generator responsible for computing the address to be used simultaneously for each of the elementary processors in order to access the correct datum. In order to carry out parallel computations based on a single instruction (SIMD principle), it is the same data access sequence that is used by each elementary processor to access its local memory and/or the neighbouring local memories via the same address.

One problem to be solved in this context is that of generating the correct address in each cycle in order to access the datum needed for the computation and to do so without introducing additional cycles for computing the addresses.

The majority of signal processing processors or SIMD systems incorporate one or more address generators, also called data address generators (DAG). These address generators operate in parallel with the computing units, thus making it possible to increase the performance of the system. Address generators implement functionalities such as scanning a contiguous address space.

Examples of address generators for various types of parallel computing architecture are presented in the publication Analog Devices, "ADSP-21160 SHARC DSP Hardware Reference, Data Address Generators" or in patents or patent applications U.S. Pat. Nos. 6,647,484, 9,203,671, U52014/0115302, U.S. Pat. Nos. 9,529,747, 6,049,858, 7,064,987, 5,778,416, 6,526,430.

One general drawback of the solutions from the prior art is that they more often than not require additional operations to be carried out so that each elementary processor is able to access the correct datum. Generally speaking, there is no known solution that allows correct access to the data in one cycle, that is to say without introducing additional operations.

SUMMARY OF THE INVENTION

The present invention aims to overcome the limitations of the solutions from the prior art by proposing an address generator for a computer with an SIMD architecture that makes it possible to compute a common address for each elementary processor without introducing additional operations and therefore without requiring the consumption of additional computing cycles.

The invention thus makes it possible to optimize the rate of base operations per cycle carried out by the computer so as to approach a usage rate of 100%. The power consumption of the computer is thereby reduced in comparison with the solutions from the prior art.

The invention is advantageously applicable to computers implementing convolutional neural networks that require a large number of elementary operations and memory access operations.

One subject of the invention is an address generator for a computer with a single instruction multiple data architecture comprising a plurality of elementary processors each associated with a local memory, each elementary processor having access to its local memory and at least one access to a neighbouring local memory of another elementary processor, the address generator being configured, in response to a computing instruction, to determine an identical memory access address for all of the elementary processors, the address generator comprising:

A first computing unit for computing a first access offset value in a first addressing dimension, and An adder for computing the memory access address as the sum of the first access offset value and of a predetermined initial offset value dependent on a memory access operation type indicated by the computing instruction from among a memory access operation to the local memory or a memory access operation to any one of the neighbouring local memories.

According to one particular aspect of the invention, the first computing unit is configured, in response to a memory access request made by the computing instruction, to increment the first access offset value by a first increment value, compare the requested memory access operation type against the previous memory access operation type, and reset the first access offset value when the number of memory access operations reaches a first maximum value or when the requested memory access operation type is different from the previous memory access operation type.

According to one particular aspect of the invention, the first computing unit comprises a comparator for comparing the requested memory access operation type against the previous memory access operation type, a register and an adder for incrementing and saving the first access offset value and a counter for counting the number of memory access operations.

According to one particular aspect of the invention, the counter is configured to reset the register when the number of memory access operations reaches the first maximum value.

According to one particular aspect of the invention, the comparator is configured to reset the register when the requested memory access operation type is different from the previous memory access operation type.

According to one particular aspect of the invention, access to the memories is multidimensional and the address generator furthermore comprises at least one additional computing unit for computing an additional access offset value in an additional addressing dimension, the adder being configured to compute the memory access address as the sum of all of the access offset values in each addressing dimension and of said initial offset value.

According to one particular aspect of the invention, each additional computing unit is configured to:
Increment a counter for counting the number of memory access operations in the additional addressing dimension,
Increment the additional access offset value by a second increment value upon each new memory access operation in the additional addressing dimension, and
Reset the additional access offset value when the number of memory access operations in the additional addressing dimension reaches a second maximum value.

According to one particular aspect of the invention, each additional computing unit comprises a register and an adder for incrementing and saving the additional access offset value and a counter for counting the number of memory access operations in the additional addressing dimension.

According to one particular aspect of the invention, the counter is configured to reset the register when the number of memory access operations in the additional addressing dimension reaches the second maximum value.

Another subject of the invention is a computer with a single instruction multiple data architecture comprising:
A host processor,
An instruction memory,
A control unit comprising an address generator according to the invention,
A plurality of elementary processors each associated with a local memory, each elementary processor having access to its local memory and at least one access to a neighbouring local memory of another elementary processor.

According to one particular aspect of the invention, the computer is configured to carry out convolution computations between a convolution filter and multidimensional data stored in the local memories with a predefined interleaving level, the first addressing dimension corresponding to a first dimension of the convolution filter, the second addressing dimension corresponding to a second dimension of the convolution filter and the additional addressing dimensions corresponding to the additional dimensions of the multidimensional data.

According to one particular aspect of the invention, the increment values are defined by the occupation plan for the data in memory, the first maximum value is equal to the size of the convolution filter in its first dimension, the maximum value in the second addressing dimension is equal to the size of the convolution filter in its second dimension and the maximum values in the additional addressing dimensions are respectively equal to the maximum sizes of the data in the additional dimensions of the data.

BRIEF DESCRIPTION OF THE DRAWINGS

Other features and advantages of the present invention will become more apparent on reading the following description in relation to the following appended drawings.

FIG. 2d illustrates one example of a memory access operation needed to carry out a second convolution pass.

DETAILED DESCRIPTION

Figure 1:
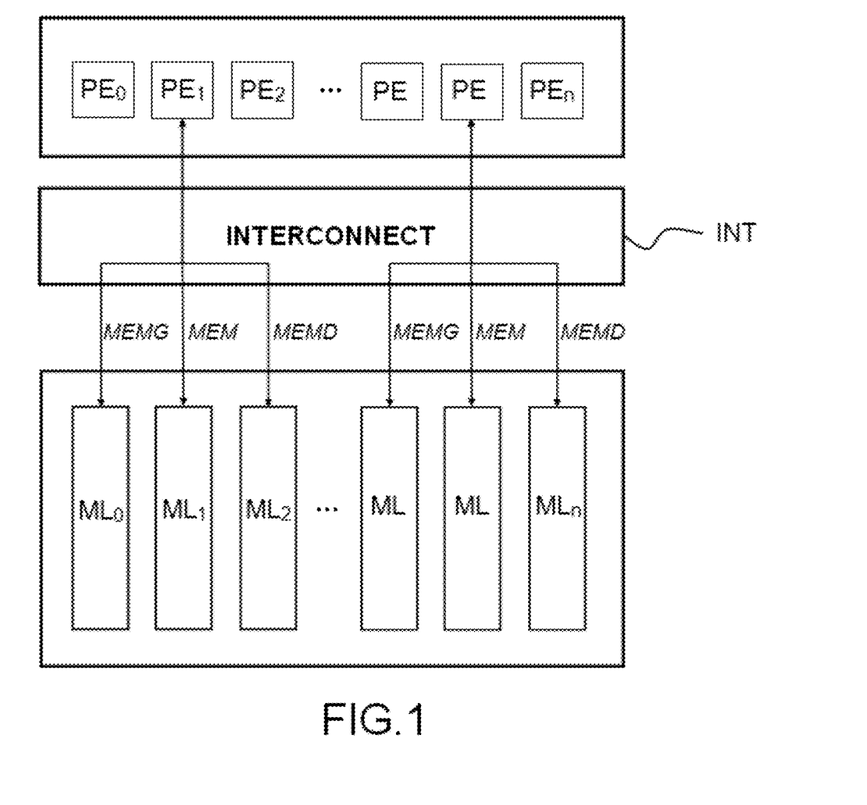
FIG. 1 shows a diagram of an SIMD computer with right-hand and left-hand neighbouring memory access for each elementary processor.

FIG. 1 shows a general diagram of an SIMD computer comprising a plurality of computing units or elementary processors $PE_1$, $PE_n$ and the same number of local memories $ML_1$, $ML_n$. Each elementary processor has access to a local memory of the same index MEM and to the left-hand and right-hand neighbouring local memories MEMG and MEMD. Thus, for example, the elementary processor $PE_2$ has access to the local memories $ML_1$, $ML_2$ and $ML_3$. The elementary processors and the local memories are coupled by way of an interconnection device INT.

The invention relates to an address generator for determining, for each instruction, a common address for all of the elementary processors that makes it possible to access a datum in one of the three memories to which it has access, and to do so in order to carry out the computation induced by the instruction. Without loss of generality, the number of memories to which an elementary processor may have access may be greater than 3, for example a plurality of left-hand neighbouring memories and a plurality of right-hand neighbouring memories.

FIGS. 2a to 2d illustrate a memory access sequence for carrying out a convolution computation on matrix (two-dimensional) data by way of an address generator according to the prior art.

Figure 2A:
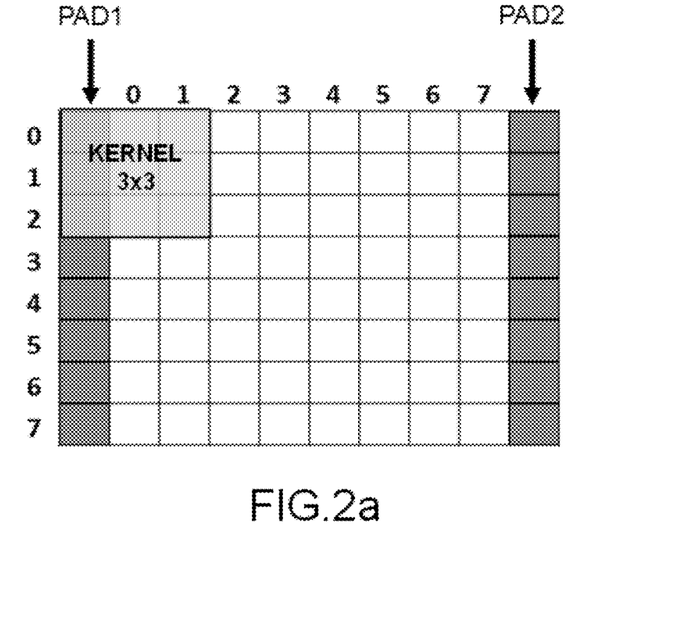
FIG. 2a illustrates a convolution operation carried out by the computer from FIG. 1 based on a convolution filter applied to a data matrix.

FIG. 2a shows a data matrix of dimensions 8 by 8 to which a convolution filter (kernel) of dimension 3 by 3 is applied. A column of null data PAD1, PAD2 or padding is added before the first column 0 and after the last column 7 of data in order to generate a result of the same width (equal to 8) at the output of the filtering operation.

In the example chosen, the computer comprises four elementary processors PE0, PE1, PE2, PE3 operating in parallel.

Figure 2B:
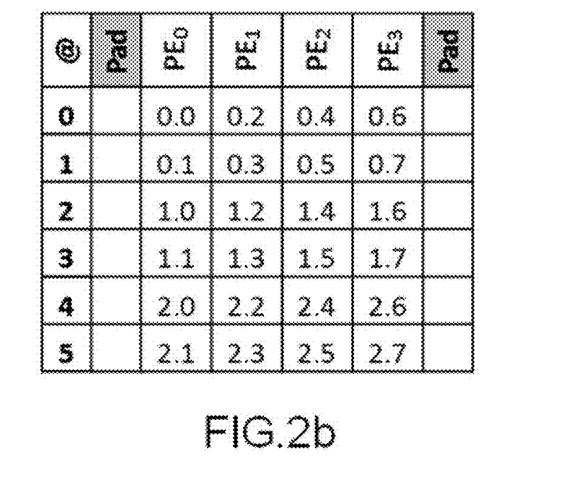
FIG. 2b illustrates one example of a memory placement of the data from FIG. 2a in the local memories of the computer from FIG. 1.

Since the processed data are of dimension 8 by 8, interleaving of depth equal to 2 is carried out in order to place the data from FIG. 2a in the memories shown in FIG. 2b. FIG. 2b shows the set of local memories (four of them) corresponding to the four elementary processors. In each memory cell, the saved datum is represented by its coordinates (x,y) in the image from FIG. 2a. In the example, each local memory is represented with a depth equal to 6 and an address that therefore varies from 0 to 5. FIG. 2b is shown only by way of illustration in order to describe the computing of two convolution rows. To carry out a full convolution computation on a data matrix of dimension 8×8 and interleaving of depth equal to 2, the depth of each local memory should be equal to 16. FIG. 2b also shows two "virtual" memory spaces Pad corresponding to null data. The interleaving of depth equal to 2 signifies that each local memory stores two consecutive pixels of one and the same row of the data matrix in a local memory column. The interleaving value may be greater than 2, and depends notably on the dimension of the data and on the number of elementary processors.

Figure 2C:
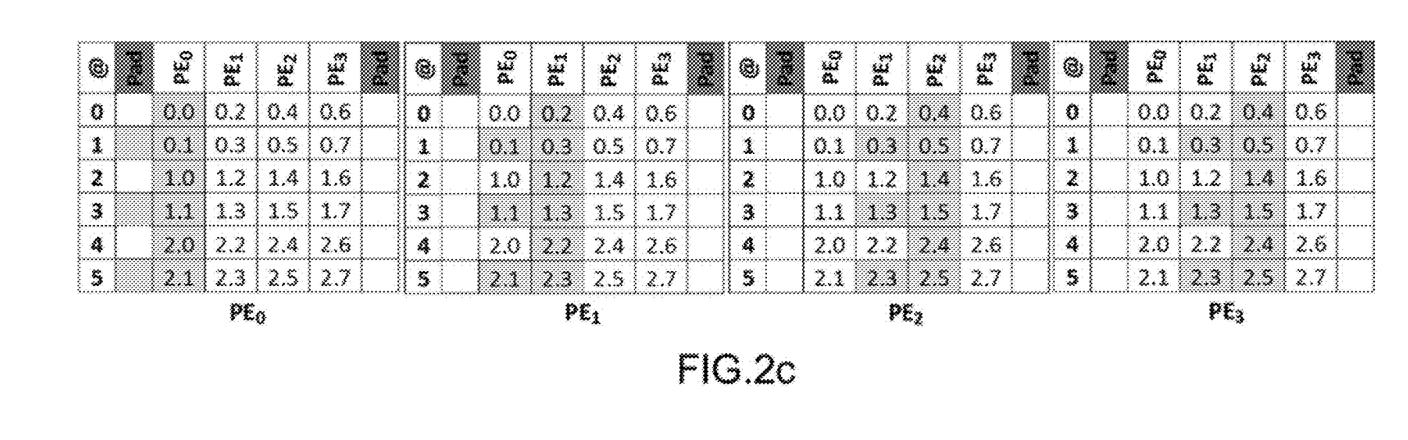
FIG. 2c illustrates one example of a memory access operation needed to carry out a first convolution pass.

By virtue of this memory placement and the fact that each elementary processor has direct access to its memory column and to that of its left-hand and right-hand neighbours, the processors are able to carry out the following computations illustrated by FIG. 2c in parallel:

The processor PE0 is able to carry out a convolution computation on the pixels (PAD); (0,0); (0,1); (PAD); (1,0); (1,1); (PAD); (2,0); (2,1), in which PAD denotes a null datum of the virtual column situated before the first memory column, The processor PE1 is able to carry out a convolution on the pixels (0,1); (0,2); (0,3); (1,1); (1,2); (1,3); (2,1); (2,2); (2,3), The processor PE2 is able to carry out a convolution on the pixels (0,3); (0,4); (0,5); (1,3); (1,4); (1,5); (2,3); (2,4); (2,5), and The processor PE3 is able to carry out a convolution on the pixels (0,5); (0,6); (0,7); (1,5); (1,6); (1,7); (2,5); (2,6); (2,7).

To process the entire image, a second convolution pass is carried out, as illustrated in FIG. 2d, in which:

The processor PE0 is able to carry out a convolution on the pixels (0,0); (0,1); (0,2); (1,0); (1,1); (1,2); (2,0); (2,1); (2,2), The processor PE1 is able to carry out a convolution on the pixels (0,2); (0,3); (0,4); (1,2); (1,3); (1,4); (2,2); (2,3); (2,4), The processor PE2 is able to carry out a convolution on the pixels (0,4); (0,5); (0,6); (1,4); (1,5); (1,6); (2,4); (2,5); (2,6), and The processor PE3 is able to carry out a convolution on the pixels (0,6); (0,7); (PAD); (1,6); (1,7); (PAD); (2,6); (2,7); (PAD) in which PAD denotes a null datum of the virtual column situated after the last memory column.

By carrying out these two convolution passes, the eight convolutions of the first row of the data matrix are computed. It is then necessary to iterate these processing operations for all of the rows of the image, that is to say 8 times for the example given in FIG. 2a, in order to carry out a full convolution computation on the entire image.

In order to be able to carry out the two convolution passes described above with the correct memory access operations using an address generator according to the prior art from the family of ADSP-21xx components, it is necessary to execute the following series of instructions:

First convolution pass:
SetAddrOffset(1)
MAC(Coef,MemL)
SetAddrOffset(0)
MAC(Coef,Mem) @++
MAC(Coef,Mem) @++
SetAddrOffset(3)
MAC(Coef,MemL)
SetAddrOffset(2)
MAC(Coef,Mem) @++
MAC(Coef,Mem) @++
SetAddrOffset(3)
MAC(Coef,MemL)
SetAddrOffset(2)
MAC(Coef,Mem) @++
MAC(Coef,Mem) @++
Second convolution pass:
SetAddrOffset(0)
MAC(Coef,Mem) @++
MAC(Coef,Mem) @++
SetAddrOffset(0)
MAC(Coef,MemR)
SetAddrOffset(2)
MAC(Coef,Mem) @++
MAC(Coef,Mem) @++
SetAddrOffset(2)
MAC(Coef,MemR)
SetAddrOffset(4)
MAC(Coef,Mem) @++
MAC(Coef,Mem) @++
SetAddrOffset(4)
MAC(Coef,MemR)

The instruction SetAddrOffset( ) makes it possible to set the base address of the address generator.

The instruction MAC( ) makes it possible to carry out a multiplication operation followed by an accumulation. This instruction takes two parameters at input, which correspond to a coefficient of the convolution filter and to a datum (a pixel of the image for example). MemL signifies that the datum belongs to the local memory of the left-hand neighbouring elementary processor. Mem signifies that the datum belongs to the current local memory and MemR signifies that the datum belongs to the local memory of the right-hand neighbouring elementary processor.

In the sequence of instructions indicated above, after the initial setting of the base address, it is necessary to update this base address 5 times by way of the instructions SetAddrOffset( ).

Thus, by adding the 9 MAC instructions needed for the computation, a total of 15 cycles are needed to carry out the convolution. The 5 additional updates of the base address increase the number of cycles by close to 50%.

One aim of the invention is to eliminate the additional cycles needed to reposition the base address during the memory access operations needed for the computations.

Figure 3:
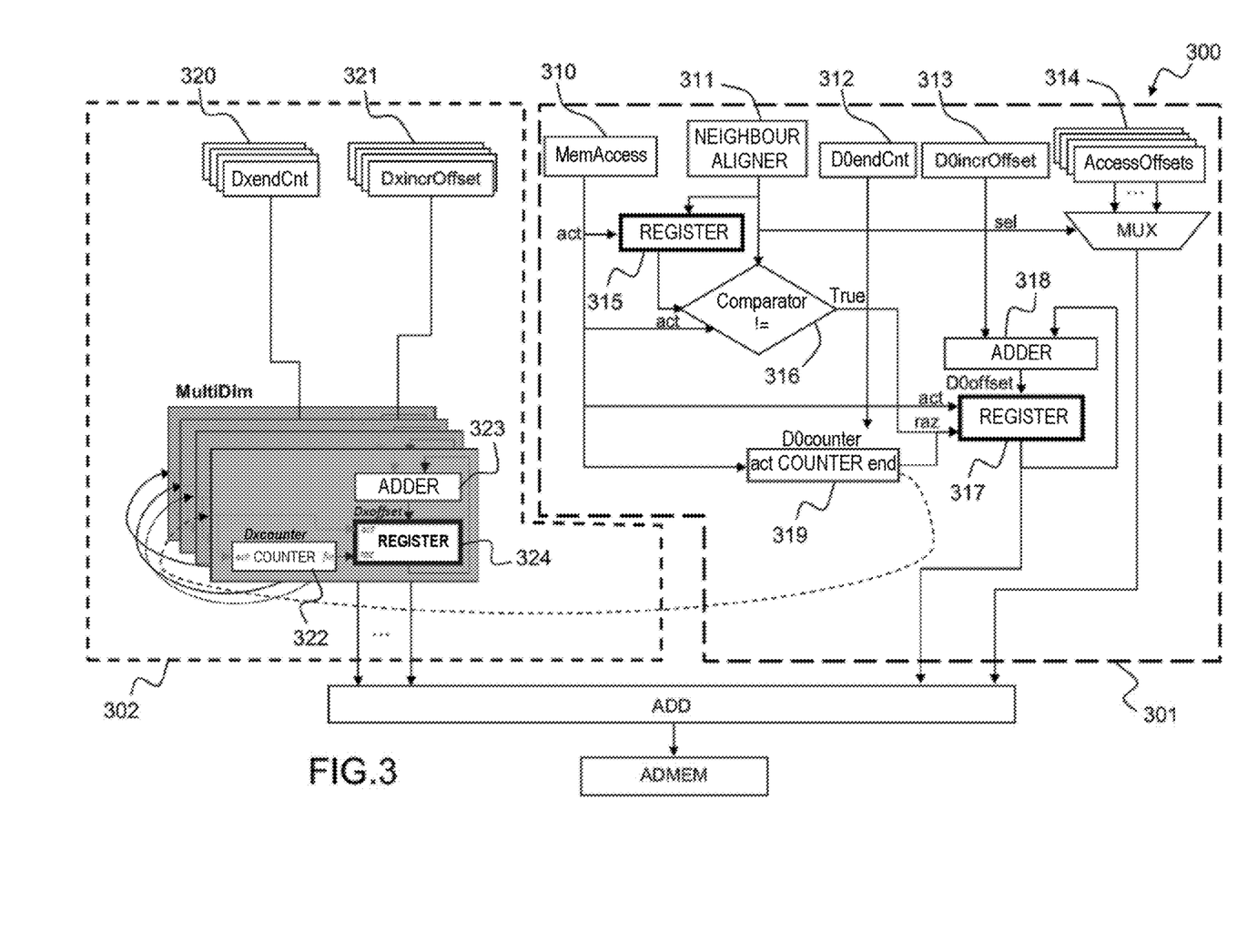
FIG. 3 shows a diagram of an address generator according to the invention.

FIG. 3 shows a generic diagram of an address generator 300 according to the invention. The address generator is configured to determine a memory address ADMEM by summing a plurality of access offsets by way of an adder ADD. The address generator 300 comprises a first part 301 dedicated to generating an offset on a first addressing dimension and a second part 302 dedicated to generating offsets on one or more additional addressing dimensions.

The number of addressing dimensions depends on the number of dimensions of the data to be processed. For example, if the input data are vector data, that is to say with a single dimension, the address generator 300 is reduced to its first part 301. If the input data are multidimensional with N dimensions, the address generator 300 comprises the two parts 301, 302, the second part 302 being configured to generate N−1 offsets corresponding to the N−1 additional dimensions of the data.

The first part 301 of the generator 300 receives, at input, a memory access signal 310 generated upon each new computing instruction to indicate to the address generator the need to access a datum in the local memory. It also receives information about the memory access operation type 311, that is to say whether it is an access operation to what is called the "central" memory associated directly with an elementary processor or whether it is an access operation to a neighbouring memory, for example a memory situated to the right or to the left of the central memory.

The computing unit 301 also takes the following as input parameters:

A value 312 of the size of the first addressing dimension, which is equal, in the example of computing a convolution, to the first dimension of the convolution filter, An increment value 313 corresponding to an access increment in the first addressing dimension. In the most common case, this increment is equal to 1, but it may take other non-zero integer values depending on the memory plane that is used, and A set of offsets 314 for each of the memories to which an elementary processor has access. The value of these offsets depends on the memory plane, as will be explained in one example below.

The computing unit 301 comprises a first register 315 and a comparator 316 that are designed to compare the memory access operation type provided by the indicator 311 at a given time to the previous access operation type.

The computing unit 301 also comprises a second register 317 and an adder 318 for incrementing a memory access value in the first addressing dimension upon each new requested memory access operation 310.

If the two access operation types are different, the comparator 316 resets the register 317. The register 317 is also reset by a counter 319 that counts the number of memory access operations from the indicator 310 up to the maximum value 312.

The access value stored in the register 317 is provided to the adder ADD with one of the offset values of the set 314 depending on the memory access operation type 311. A multiplexer MUX is for example used to select the correct offset value.

The memory access signal 310 triggers four events: comparing the access operation type 311 against the previous access operation, incrementing the access counter 319 in the first addressing dimension, saving the access operation type 311 in the register 315 and updating the second register 317 with the accumulation of the increment 313.

The second part 302 of the address generator comprises as many computing units as there are additional addressing dimensions. Each computing unit receives, at input, an addressing dimension size value 320 and an increment value 321 corresponding to an access increment in this addressing dimension.

Each computing unit comprises a counter 322 for counting the number of access operations in the addressing dimension up to the maximum value 320, an adder 323 and a register 324 for incrementing a memory access value in the addressing dimension under consideration. Each computing unit provides the adder ADD with an access value in one addressing dimension.

Figure 4:
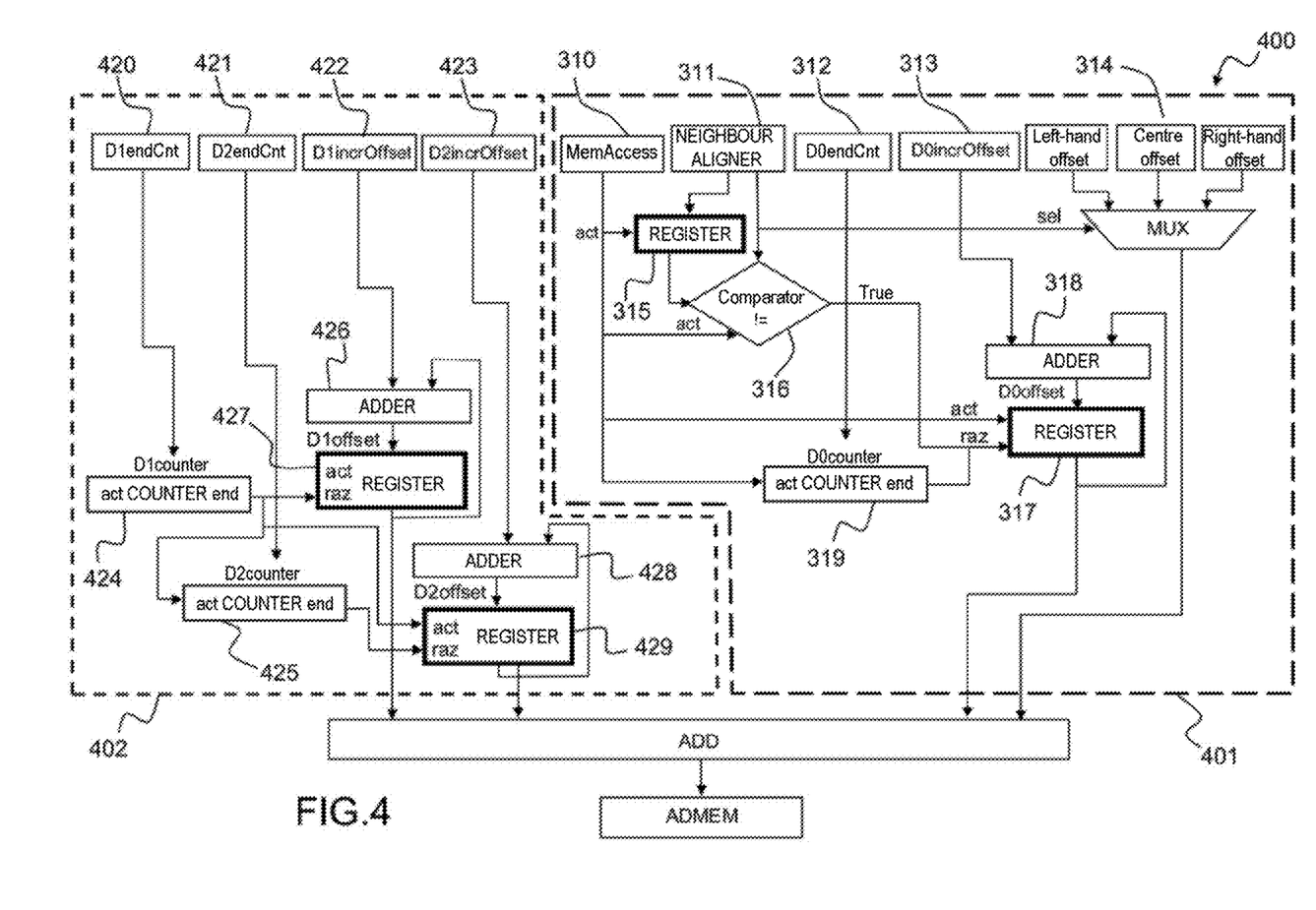
FIG. 4 shows a diagram of an address generator according to a first particular embodiment of the invention applicable to computations on three-dimensional data.

FIG. 4 shows one example of an address generator 400 according to one particular embodiment of the invention applicable to three-dimensional data. In this example, the memory access operations correspond to computations of convolutions between a filter of dimension D0×D1 and data organized in the form of a number D2 of channels, each channel comprising a 2D data matrix. Elements that are identical between FIGS. 3 and 4 comprise the same references. The essential differences between the diagram of FIG. 3 and that of FIG. 4 are as follows:

The set of offsets 314 comprises three values for respective access operations to the left-hand, central and right-hand memories, The part 402 of the address generator comprises two computing units dedicated respectively to the last two dimensions (dimension D1 of the convolution filter and dimension D2 corresponding to the number of channels).

The operation of the address generator 400 is detailed on one example of computing a convolution between a convolution filter of dimension 3×3 and a set of three-dimensional data corresponding to two image channels of sizes 8×8 pixels (same example as in FIG. 2a but with two channels rather than just one).

Figure 5:
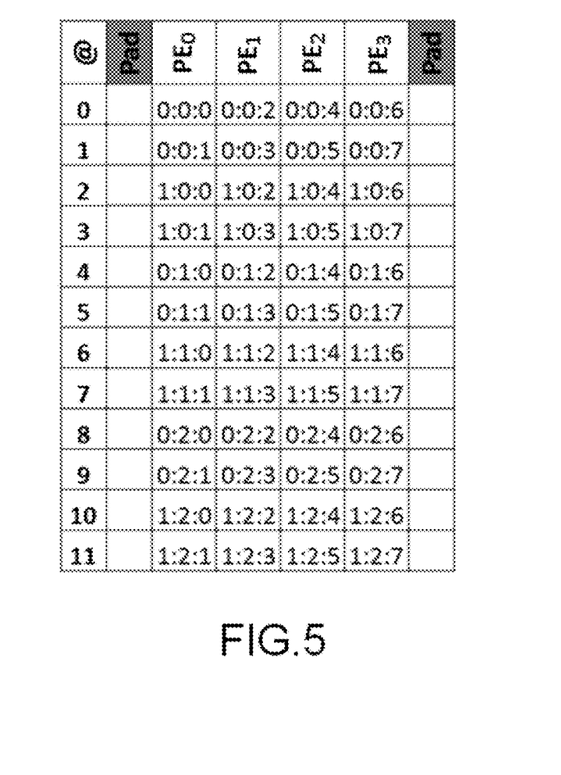
FIG. 5 shows one example of a memory placement of the data for an 8×8×2 three-dimensional data matrix.

FIG. 5 outlines one example of a memory placement for a computing device comprising four elementary processors PE0, PE1, PE2, PE3 associated with four local memories and with an interleaving depth equal to two in order to process the matrices of dimension 8×8.

Two "virtual" memory columns containing null values are placed to the left of the local memory of the first elementary processor PE0 and to the right of the local memory of the last elementary processor PE3.

The first column @ in the table of FIG. 5 gives the address of the memory cell. The data in each memory cell are identified by their three-dimensional coordinates z.y.x, where z is the coordinate along the channels, varying between 0 and 1, y is the coordinate along the rows of the matrix, varying between 0 and 7, and x is the coordinate along the columns of the matrix, varying between 0 and 7.

Figure 6:
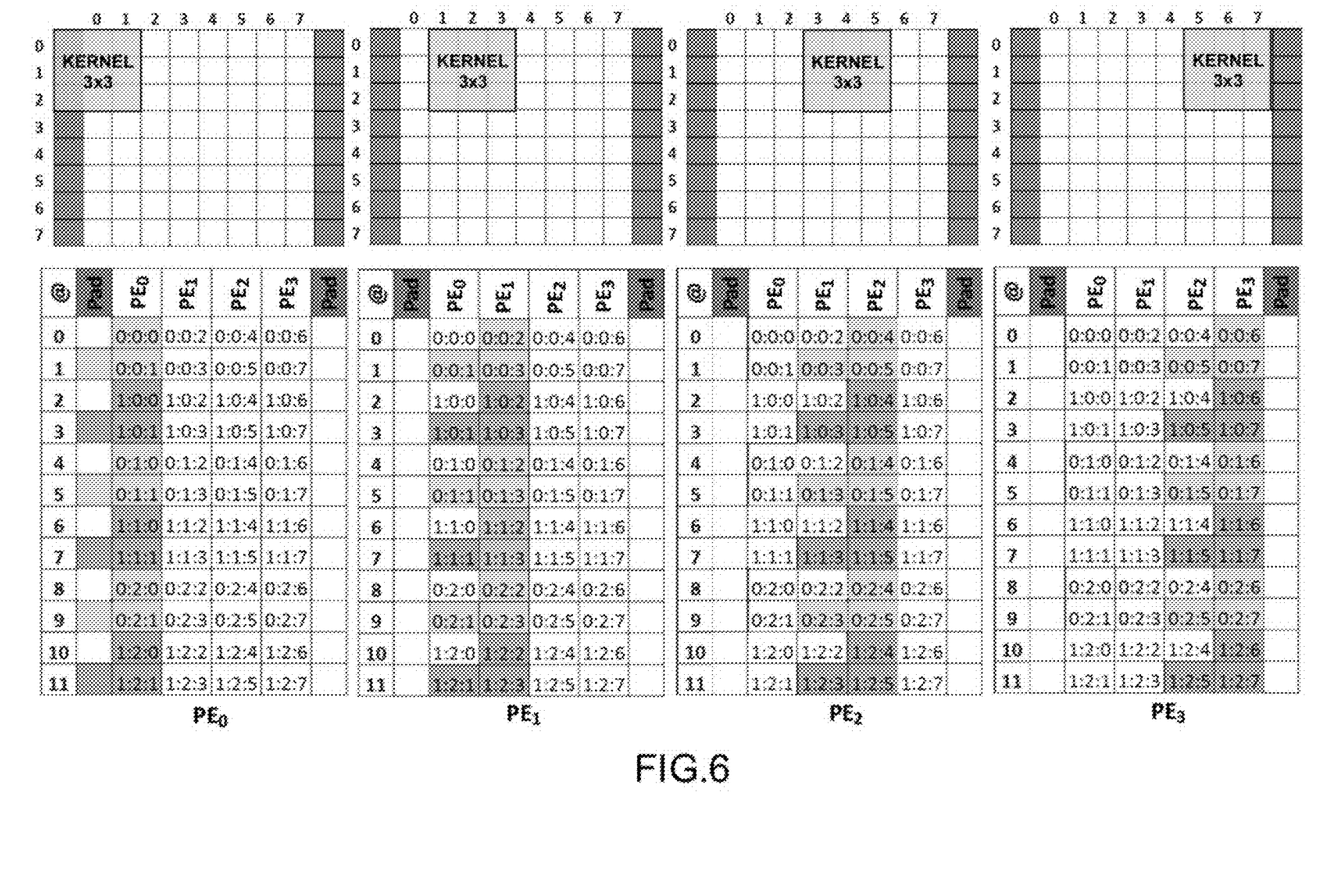
FIG. 6 shows one example of a data access sequence for carrying out a convolution pass.

FIG. 6 outlines the memory access operations carried out by each elementary processor in order to carry out a convolution pass on the first row 0 of the matrix. For each elementary processor, FIG. 6 outlines the placement of the convolution filter on the data matrix. The memory addresses 0, 1, 4, 5, 8, 9 correspond to the pixels of the first channel, whereas the memory addresses 2, 3, 6, 7, 10, 11 correspond to the pixels of the second channel.

Each elementary processor computes two different convolution kernels (on the two channels) in parallel. The same data access sequence allows each elementary processor to access the data corresponding to the convolution kernel that it is responsible for computing.

As explained above, an address generator according to the prior art that makes it possible to scan only a contiguous memory area is forced to regularly reposition its base address depending on the access operation type (direct or neighbouring), the channel or the row to be accessed. These repositioning operations require additional computing cycles.

By contrast, the address generator according to the invention makes it possible to compute each address in a single cycle using multidimensional offset loops and makes it possible to detect the change of access operation type with management of the specific address.

In the example of FIG. 4, the values of the access offsets 314 are 1 for the left-hand memory and 0 for the central and right-hand memories. The offset value 1 corresponds to the fact that the number of padding pixels is equal to 1, while the interleaving has a depth equal to 2. To ensure continuity of the horizontal row, it is therefore necessary to use a padding value on 2 (see FIG. 6). The end values of COUNTERS for each dimension are as follows: 3 for dimension X (value 312), 3 for dimension Y (value 420) and 2 for dimension Z (value 421). The counter increment values are as follows: 1 for dimension X (value 313), 4 for dimension Y (value 422) and 2 for dimension Z (value 423). These values correspond to a convolution filter of dimension 3×3 and to three-dimensional data with 2 channels on the third dimension.

Figure 7:
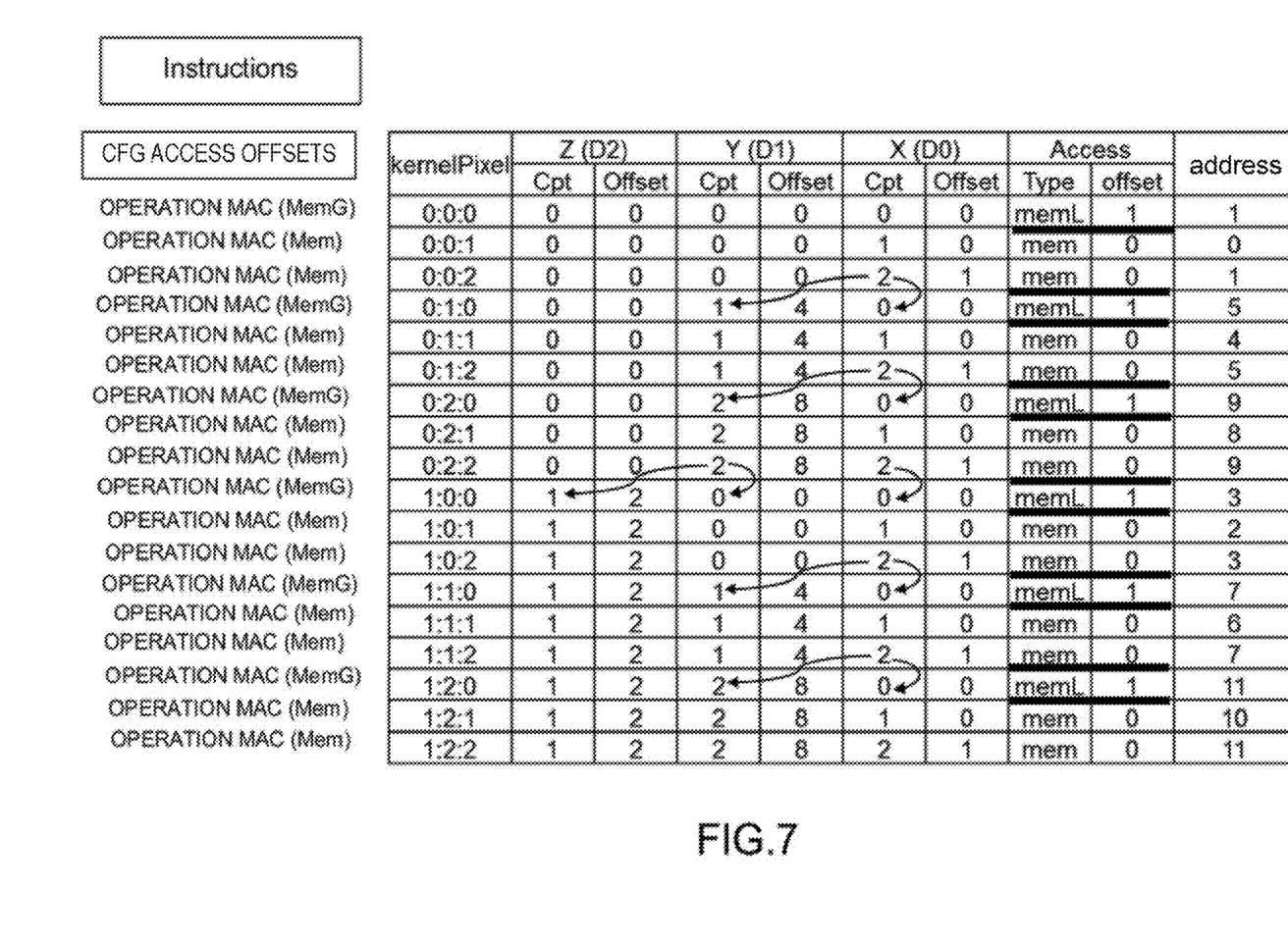
FIG. 7 shows one example of computing addresses carried out by the address generator from FIG. 4 for the data access sequence from FIG. 6.

FIG. 7 shows, using a table, the operation of the address generator 400 for determining the memory access addresses for each instruction of a convolution computation. The example given in FIG. 7 corresponds to a convolution computation on the first 9 pixels situated on the first three rows and the first three columns of a matrix and for two channels.

The example may be transposed to compute any 3×3 convolution kernel for any elementary processor.

The access routine shown in FIG. 7 corresponds to the memory access operations shown in FIG. 6.

The first column of the table gives the series of instructions for carrying out the computation. The column "kernelpixel" gives the coordinates of the coefficient of the convolution filter.

The columns Z(D2), Y(D1) and X(D0) respectively give the values of the counters 425, 424, 319 and the values of the offsets 429, 427, 317 for each of the addressing dimensions D2, D1, D0.

To explain the progress of the access routine, it is necessary to take the point of view of the elementary processor PE0, but this routine is applicable in the same way to each of the other elementary processors and in parallel.

The elementary processor PE0 has (central) direct access to the first column of the local memory (see FIG. 6), right-hand access to the second column (that of the processor PE1) and left-hand access to a virtual padding column.

The first instruction is a MAC(MemG) operation on the left-hand memory. The values of the counters 425 and offset 429 in the addressing dimension D2 corresponding to the dimension of the channels are equal to 0. The values of the counters 424 and offset 428 in the addressing dimension D1 corresponding to the rows of a matrix are also equal to 0. The values of the counters 319 and offset 317 in the addressing dimension D0 corresponding to the columns of a matrix are also equal to 0. The access operation type is an access operation to the left-hand memory memG, and the left-hand memory access offset is therefore equal to 1. The sum of the four offset values is equal to 1, thereby giving the address value 1 in the left-hand memory corresponding to the padding column (see FIG. 6).

The following instruction is a MAC(Mem) operation on the (central) direct memory. The access counter in the first dimension D0 is incremented by 1. Since there is a change of memory access operation type (change from a left-hand memory access operation to a central memory access operation), the offset register 317 is reset to 0. The access offset to the central memory is 0, and the final address is therefore equal to 0 in the central memory. The processor PE0 will read the pixel with coordinates 0.0.0 (see FIG. 6).

The following instruction is also a MAC(Mem) operation on the (central) direct memory. The access counter in the first dimension D0 is incremented by 1 so as to reach the value 2. This time, there is no change of access operation type (two consecutive access operations to the central memory), and therefore the value of the offset in the register 317 is incremented by 1. The access offset to the central memory is 0, and the final address is therefore equal to 1 in the central memory. The processor PE0 will read the pixel with coordinates 0.0.1 (see FIG. 6).

The following instruction is a MAC(MemG) operation on the left-hand memory. The counter 319 reaches its maximum value (equal to 3): it is therefore reset to 0 and it activates the incrementation of the counter 424 in the second addressing dimension D1. The offset 427 in the dimension D1 is incremented by the increment value, which is equal to 4. The access offset to the left-hand memory is 1, and the final address is therefore equal to 4+1=5 in the left-hand memory. The processor PE0 will read the pixel at the address 5 from the "padding" memory (see FIG. 6).

The following instruction is a MAC(Mem) operation on the central memory. The access counter in the first dimension D0 is incremented by 1. Since there is a change of memory access operation type (change from a left-hand memory access operation to a central memory access operation), the offset register 317 is reset to 0. The access offset to the central memory is 0, and the final address is therefore equal to 4 in the central memory. The processor PE0 will read the pixel with coordinates 0.1.0 (see FIG. 6).

The following instruction is also a MAC(Mem) operation on the (central) direct memory. The access counter in the first dimension D0 is incremented by 1 so as to reach the value 2. This time, there is no change of access operation type (two consecutive access operations to the central memory), and therefore the value of the offset in the register 317 is incremented by 1. The access offset to the central memory is 0, and the final address is therefore equal to 4+1=5 in the central memory. The processor PE0 will read the pixel with coordinates 0.1.1 (see FIG. 6).

The access routine continues in this way so as to compute the first convolution kernel on the first channel. The following addresses generated by the address generator are (9 left-hand memory), (8 central memory), (9 central memory).

Next, the access counter in the second dimension D1 reaches its maximum value (equal to 3) and is reset to 0. It also triggers the incrementation of the counter in the third dimension D2 by an increment of 1 in order to start the computation of the convolution kernel on the second channel.

The nine addresses generated to compute this second convolution kernel are as follows: (3 left-hand memory), (2 central memory), (3 central memory), (7 left-hand memory), (6 central memory), (7 central memory), (11 left-hand memory), (10 central memory), (11 central memory).

The address generator 400 thus allows each elementary processor to access the correct datum in memory in one cycle for each computing instruction.

Figure 8:
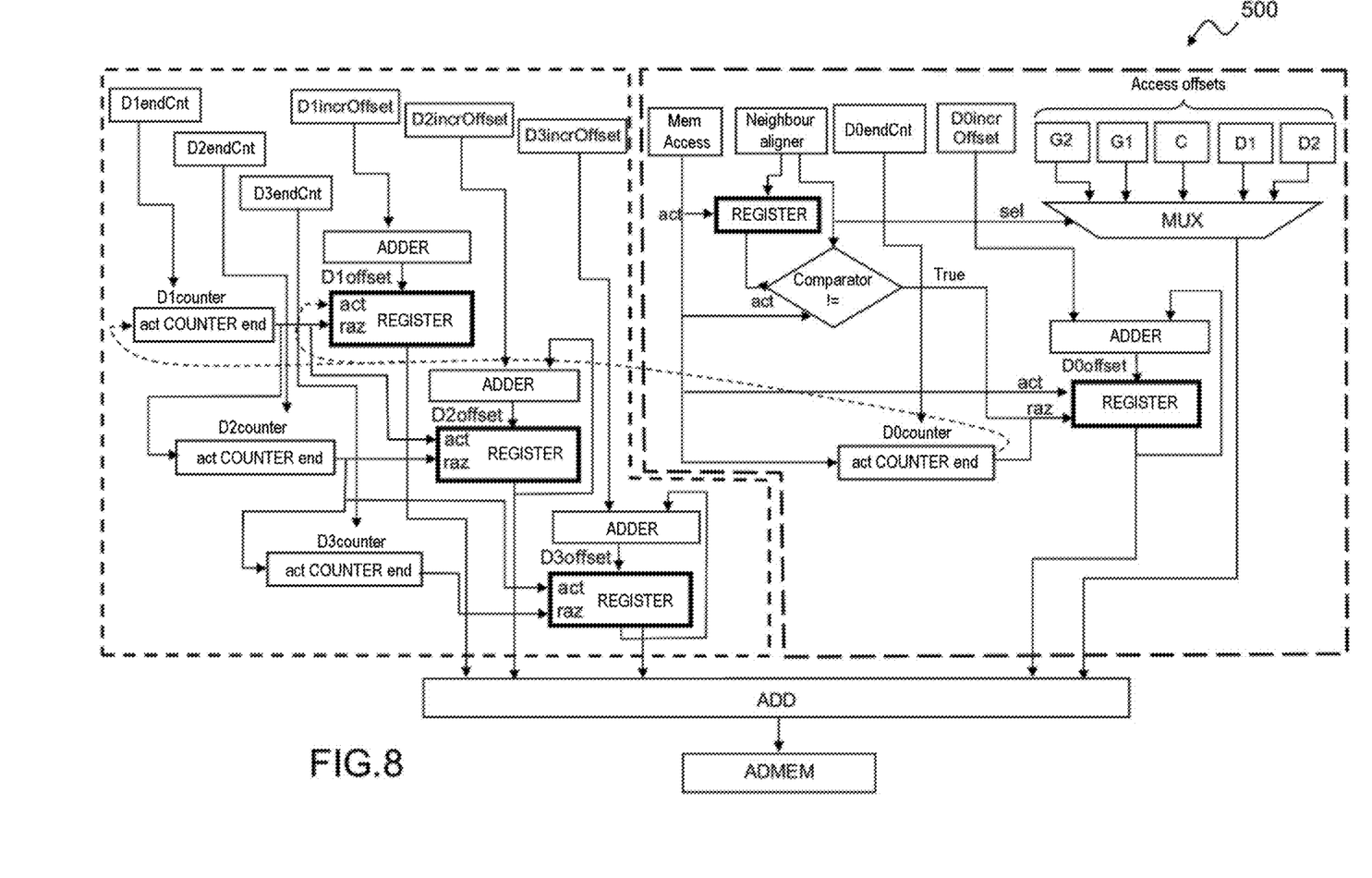
FIG. 8 shows a diagram of an address generator according to a second particular embodiment of the invention applicable to computations on four-dimensional data.

FIG. 8 outlines another exemplary embodiment of an address generator 500 according to the invention applicable to multi-dimensional data with four dimensions and to elementary processors having five distinct access operation types, a central access operation, two access operations to the two left-hand memories and two access operations to the two right-hand memories.

The operation of the address generator 500 is identical to that of the address generator 400, with the difference that the final address is equal to the sum of five offsets (one offset more corresponding to the additional addressing dimension).

Figure 9:
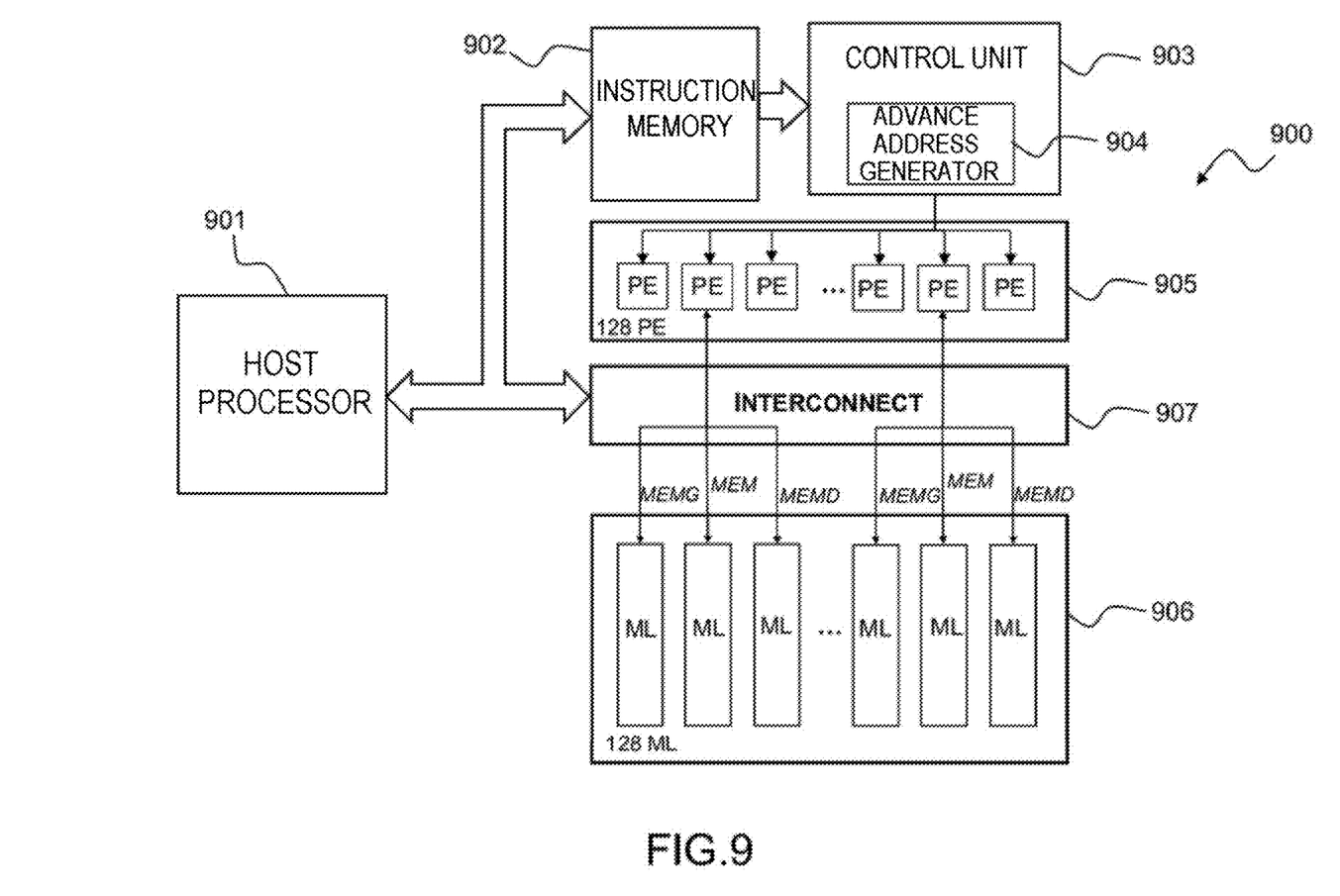
FIG. 9 shows a diagram of an SIMD computer comprising an address generator according to the invention.

FIG. 9 shows a diagram of an SIMD computing device comprising an address generator according to the invention. The computing device 900 comprises a host processor 901, an instruction memory 902, a control unit 903 comprising an address generator 904 according to the invention, a set of elementary processors 905, a set of local memories 906 and interconnection means 907 for allowing the elementary processors to access the local memories.

The host processor 901 drives the instruction memory 902, which itself generates signals intended for the control unit 903. The address generator 904, upon each new instruction, provides a memory access address and an access operation type that are common to the set of elementary processors so that they access the correct datum stored in one of the local memories.

The invention claimed is:

1. An address generator for a computer with a single instruction multiple data architecture comprising a plurality of elementary processors each associated with a local memory, each elementary processor having access to the local memory with which it is associated and access to at least one neighbouring local memory of another elementary processor, the address generator being configured, in response to a computing instruction, to determine an identical memory access address for all of the elementary processors, the address generator comprising:
a first computing unit for computing a first access offset value in a first addressing dimension, and
an adder for computing the memory access address as the sum of the first access offset value and of a predetermined initial offset value dependent on a memory access operation type indicated by the computing instruction from among a memory access operation to the local memory or a memory access operation to any one of the neighbouring local memories.

2. The address generator according to claim 1, wherein the first computing unit is configured, in response to a memory access request having an operation type made by the computing instruction, to
increment the first access offset value by a first increment value, compare a requested memory access operation against a previous memory access operation type, and
reset the first access offset value when a number of memory access operations reaches a first maximum value or when the requested memory access operation type is different from the previous memory access operation type.

3. The address generator according to claim 2, wherein the first computing unit comprises a comparator for comparing the requested memory access operation type against the previous memory access operation type, a register and an adder for incrementing and saving the first access offset value and a counter for counting the number of memory access operations.

4. The address generator according to claim 3, wherein the counter is configured to reset the register when the number of memory access operations reaches the first maximum value.

5. The address generator according to claim 3, wherein the comparator is configured to reset the register when the requested memory access operation type is different from the previous memory access operation type.

6. The address generator according to claim 1, wherein access to the local memory and access to the at least one neighbouring local memory of another elementary processor is multidimensional and the address generator furthermore comprises at least one additional computing unit for computing an additional access offset value in an additional addressing dimension, the adder being configured to compute the memory access address as the sum of all of the access offset values in each addressing dimension and of said initial offset value.

7. The address generator according to claim 6, wherein each additional computing unit is configured to:
increment a counter for counting a number of memory access operations in the additional addressing dimension,
increment the additional access offset value by a second increment value upon each new memory access operation in the additional addressing dimension, and
reset the additional access offset value when the number of memory access operations in the additional addressing dimension reaches a second maximum value.

8. The address generator according to claim 7, wherein each additional computing unit comprises a register and an adder for incrementing and saving the additional access offset value and a counter for counting the number of memory access operations in the additional addressing dimension.

9. The address generator according to claim 8, wherein the counter is configured to reset the register when the number of memory access operations in the additional addressing dimension reaches the second maximum value.

10. A computer with a single instruction multiple data architecture comprising:
a host processor,
an instruction memory,
a control unit comprising an address generator according to claim 1, and
a plurality of elementary processors each associated with a local memory, each elementary processor having access to local memory with which it is associated and access to at least one neighbouring local memory of another elementary processor.

11. The computer according to claim 10, configured to carry out convolution computations between a convolution filter and multidimensional data stored in the local memories with a predefined interleaving level, a first addressing dimension corresponding to a first dimension of the convolution filter, a second addressing dimension corresponding to a second dimension of the convolution filter and additional addressing dimensions corresponding to additional dimensions of the multidimensional data.

12. The computer according to claim 11, wherein increment values are defined by an occupation plan for the data in memory, a first maximum value is equal to the size of the convolution filter in the first dimension, a second maximum value in the second addressing dimension is equal to the size of the convolution filter in the second dimension and maximum values in the additional addressing dimensions are respectively equal to the maximum sizes of the data in the additional dimensions of the data.

* * * * *